US008359111B2

(12) United States Patent
Lu et al.

(10) Patent No.: US 8,359,111 B2
(45) Date of Patent: Jan. 22, 2013

(54) METHOD AND APPARATUS FOR CONTROLLING A DISTRIBUTED AUTOMATION SYSTEM

(75) Inventors: Zhong Kang Lu, Singapore (SG); Zhi Qiang Yu, Shanghai (CN); Qi Ran Zhang, Shanghai (CN)

(73) Assignee: Siemens Aktiengessellschaft, Munich (DE)

(*) Notice: Subject to any disclaimer, the term of this patent is extended or adjusted under 35 U.S.C. 154(b) by 476 days.

(21) Appl. No.: 12/755,543

(22) Filed: Apr. 7, 2010

(65) Prior Publication Data

US 2010/0280631 A1    Nov. 4, 2010

(30) Foreign Application Priority Data

Apr. 7, 2009   (CN) .......................... 2009 1 0131168

(51) Int. Cl.
| | |
|---|---|
| G05B 13/02 | (2006.01) |
| G06F 7/60 | (2006.01) |
| G06F 17/10 | (2006.01) |
| G06F 17/00 | (2006.01) |
| G06F 17/20 | (2006.01) |
| G06F 15/00 | (2006.01) |
| G06F 15/18 | (2006.01) |

(52) U.S. Cl. .................. 700/31; 700/52; 703/2; 706/11; 706/23; 706/26; 706/62

(58) Field of Classification Search ..................... 700/31, 700/52; 703/2; 706/11, 23, 26, 62
See application file for complete search history.

(56) References Cited

U.S. PATENT DOCUMENTS

| | | | | |
|---|---|---|---|---|
| 6,654,729 | B1* | 11/2003 | Hickman et al. ................. | 706/15 |
| 7,664,723 | B2* | 2/2010 | Langworthy ..................... | 706/62 |
| 8,180,617 | B1* | 5/2012 | Klee ................................ | 703/13 |
| 2002/0198697 | A1* | 12/2002 | Datig ................................ | 704/1 |
| 2007/0094166 | A1* | 4/2007 | Addison ........................... | 706/13 |
| 2009/0124506 | A1* | 5/2009 | Keinan .............................. | 506/7 |
| 2011/0004579 | A1* | 1/2011 | Snider .............................. | 706/25 |

OTHER PUBLICATIONS

On the computational power of Brane Calculi, Third Workshop on Computational Methods in Systems Biology, 28 pages, 2005, by Nadia Busi and Roberto Gorrieri.*
A Universality Result for a Membrane Calculus, International Journal of Foundations of Computer Science, 20 pages, 2005, by Luca Cardelli and Gheorghe Paun.*
Brane Calculi. Interactions of Biological Membranes, 19 pages, 2005, by Luca Cardelli.*
Brane Calculi, Mobile Calculi Course, presented at BRICS University of Aarhus, Dec. 2004, 51 pages, by Jesus F Almansa.*

(Continued)

*Primary Examiner* — Ronald Hartman, Jr.
(74) *Attorney, Agent, or Firm* — Cozen O'Connor

(57) ABSTRACT

A method and an apparatus for controlling a distributed automation system, wherein the method comprises determining global constraint rules according to the cooperative relationships between function blocks in the distributed automation system, and establishing a mathematical model based on Membrane Calculus, performing the instantiation of the established mathematical model based on Membrane Calculus according to an executor corresponding to each of the function blocks in the distributed automation system, so as to produce control logics for output to the distributed automation system. If disturbance information is received from the distributed automation system, altering the parameters of the instantiation of the mathematical model based on Membrane Calculus are altered using the disturbance information, so as to produce control logics for outputting to said distributed automation system. The present invention is capable of effectively dealing with all types of unpredictable disturbances, thus improving the adaptability thereof.

19 Claims, 5 Drawing Sheets

OTHER PUBLICATIONS

Wikipedias definitin for Mobile Membranes, printed from Internet on Jul. 24, 2012, 12 pages.*

Introduction to Membrane Computing, Chapter 1, pp. 1-42, printed from Internet on Sep. 18, 2012, by Gheorghe Paun.*

Solving Problems in a Distributed Way in Membrane Computing Systems: dP Systems, pp. 1-13, 2010, International Journal of Computers, Communications and Control, by Gheorghe Paun and M.J. Perez Jimenez.*

* cited by examiner

-- PRIOR ART --

METHOD AND APPARATUS FOR CONTROLLING A DISTRIBUTED AUTOMATION SYSTEM

BACKGROUND OF THE INVENTION

1. Field of the Invention

The present invention relates to the field of automation technology and, more particularly, to a method and apparatus for controlling a distributed automation system.

2. Description of the Related Art

With the rapid development of the production and manufacturing sectors in the global market economy, there is an increasingly important need to improve the efficiency and adaptability of production and manufacturing systems. Along with this need, production and manufacturing systems need to have the capability to deal with the positional disturbances generated by changes in product needs, control systems and commercial processing.

Recently, automation technology has gradually developed towards distributed control, and distributed control is now capable of making operations and cooperation between various machines and pieces of equipment more optimized through standardized interfaces, thus reducing establishment and operational costs.

FIG. 1 is a system diagram for distributed automation control. As shown in FIG. 1, the system has a plurality of function blocks (FB) with standard interfaces, i.e., a transporting device block 102, a processing block 103, a scanning block 104 and a packaging block 105, cooperation between these function blocks being controlled by a cooperation control block 101, and the data necessary in the control process being able to be input by peripheral equipment, such as a human-machine interface 100. However, in the prior art, due to the cooperation control logics used by the cooperation control block 101, which implement the cooperative relationships between the function blocks, in a hard-coded manner, the cooperation unit control block 101 can only deal with predictable disturbances. If unpredictable disturbances occur, system operation must stop to allow new codes to be manually written. Therefore, the existing distributed automation control solutions waste not only time but also manpower, and there are also certain limitations in the efficiency and adaptability of the distributed automation system.

SUMMARY OF THE INVENTION

It is therefore an object of the present invention to provide a method and apparatus for controlling a distributed automation system, so as to effectively deal with all unpredictable disturbances, and to improve the adaptability thereof.

This and other objects and advantages are achieved in accordance with the invention by a method for controlling the distributed automation system, which method comprises determining global constraint rules according to the cooperative relationships between function blocks in the distributed automation system, and establishing a mathematical model based on Membrane Calculus, performing the instantiation of the established mathematical model based on Membrane Calculus according to the executor corresponding to each of the function blocks in the distributed automation system, generating control logics for output to the distributed automation system, and if the disturbance information is received from the distributed automation system, altering the parameters of the instantiation of the mathematical model based on Membrane Calculus by using the disturbance information, and then generating control logics for outputting to the distributed automation system.

Here, the establishment of the mathematical model based on Membrane Calculus comprises: mapping each of the function blocks in the distributed automation system onto the membrane of the mathematical model based on the Membrane Calculus, mapping the cooperative relationships between the function blocks onto the global constraint rules of the mathematical model based on Membrane Calculus, and thus establishing the mathematical model based on Membrane Calculus.

In accordance with the invention, the global constraint rules comprise a synchronization constraint (Synchronization), which includes event splitting and event merging, a transition constraint (Transition), which includes permissible event propagating, event detaching and event selecting, a delay constraint (Delay), a loop limit constraint (Loop Limit), and a dependence constraint (Dependence), which includes a sequence constraint and a parallel constraint.

Preferably, following the establishment of the mathematical model based on Membrane Calculus, the method further comprises verifying the mathematical model based on Membrane Calculus at Syntax Level, Simulation Level or Criteria Level, and if the verification passes, performing the instantiation of the mathematical model established based on the Membrane Calculus in accordance with the executor corresponding to each of the function blocks in the distributed automation system, and if the verification fails, re-performing the step of determining global constraint rules in accordance with the cooperative relationships between the function blocks in the distributed automation system.

Here, the performance of the instantiation of the mathematical model based on Membrane Calculus comprises using the information of the executor corresponding to each of the function blocks in the distributed automation system as the instantiation parameters corresponding to each of the membranes.

The alteration of the instantiation parameters of the mathematical model based on Membrane Calculus comprises determining the function blocks whose executor information has been altered according to the received disturbance information, and altering the instantiation parameters of the corresponding membrane of the function block so determined.

In accordance with the invention, establishing the control logics comprises rewriting, according to a logic rewriting method, the mathematical model based on Membrane Calculus after the instantiation thereof or the alteration of the instantiation parameters thereof, and generating the control logics.

The present invention also provides an apparatus for controlling a distributed automation system which comprises a first user interface for determining global constraint rules according to cooperative relationships acquired between function blocks in the distributed automation system and for providing the global constraint rules to a model establishing unit and a model establishing unit for establishing a mathematical model based on Membrane Calculus according to the global constraint rules.

The apparatus also includes a control logic generator unit for generating, according to the executor corresponding to each of the function blocks in the distributed automation system and after the instantiation of the mathematical model based on Membrane Calculus, control logics for outputting to the distributed automation system and altering the instantiation parameters of the mathematical model based on Membrane Calculus using the disturbance information provided by the disturbance acquiring unit, thus generating the control logics for outputting to the distributed automation system and a disturbance acquiring unit, for receiving disturbance information from the distributed automation system and providing the same to the control logic generator unit.

In preferred embodiments, the apparatus further comprises a model verifying unit for verifying the mathematical model based on Membrane Calculus established by the model at Syntax Level, Simulation Level or Criteria Level establishing unit. If the verification passes, then the control logic generator unit is triggered to perform the operations of the instantiation and to generate the control logics, and if the verification fails, then the first user interface is instructed to re-acquire the cooperative relationships between the function blocks in the distributed automation system.

Here, the control logic generator unit comprises an instantiating subunit for performing instantiation of the mathematical model based on Membrane Calculus according to the executor corresponding to each of the function blocks in the distributed automation system, and for altering the instantiation parameters of the mathematical model based on Membrane Calculus using disturbance information provided by the disturbance acquiring unit, a control logics generating subunit for rewriting, according to a rewriting logic method, the mathematical model based on Membrane Calculus after the instantiation thereof or the alteration of the instantiation parameters and generating the control logics, and a control logics outputting subunit for outputting the control logics generated by said control logics generating subunit to the distributed automation system.

Furthermore, the apparatus also comprises a second user interface for acquiring the instantiation parameters input by a user according to the information of the executor corresponding to each of the function blocks in the distributed automation system, or the instantiation parameters called from an instantiation parameter database, and providing the instantiating parameter to said instantiating subunit, where the instantiating subunit assigns the instantiation parameters to the corresponding membrane of each of the function blocks, so as to perform instantiation of the mathematical model based on Membrane Calculus.

The instantiating subunit determines the function blocks whose executor information has been altered according to the disturbance information provided by said disturbance acquiring unit, and alters the instantiation parameters of the corresponding membrane of the function block so determined, so as to generate the control logics for output to the distributed automation system.

Based on the above description, it is apparent that the method and apparatus provided by the present invention determine the global constraint rules according to the cooperative relationships between the FBs in the distributed automation system, establish the mathematical model based on Membrane Calculus, and generate, according to the executor corresponding to each FB, the control logics after having performed the instantiation of the mathematical model for output to the distributed automation system. In this way, when disturbances occur in the distributed automation system, the disturbances do not affect or alter the established mathematical model, and there is no need to write new codes manually. Consequently, the only task required is to automatically alter the instantiation parameters of the mathematical model based on Membrane Calculus by using the disturbance information, and to generate new control logics for outputting to the distributed automation system. As a result, there is no need to stop the operation of the distributed automation system, saving both time and manpower. Moreover, when the method of the present invention is used to establish the mathematical model and to generate the control logics, all the disturbances that occur will only affect the instantiation parameters of the membranes, where the method for generating new control logics by employing this feature is capable of effectively dealing with all the unpredictable disturbances, and thus greatly improving its adaptability.

Other objects and features of the present invention will become apparent from the following detailed description considered in conjunction with the accompanying drawings. It is to be understood, however, that the drawings are designed solely for purposed of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described therein.

DETAILED DESCRIPTION OF THE PREFERRED EMBODIMENTS

In order to make the objects, technical solutions and advantages of the present invention more apparent, the present invention is described in detail hereinbelow in conjunction with the accompanying drawings and particular embodiments.

Figure 1:
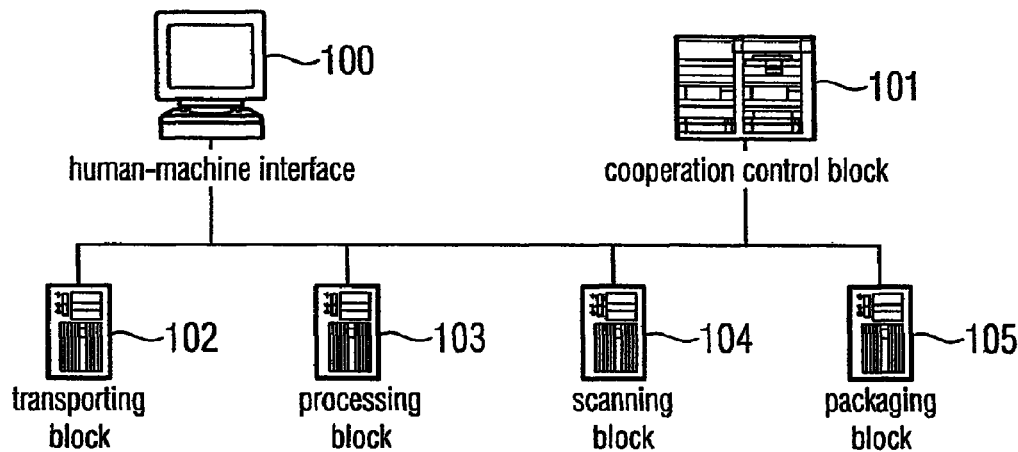
FIG. 1 is a system diagram for distributed automation control.
Figure 2:
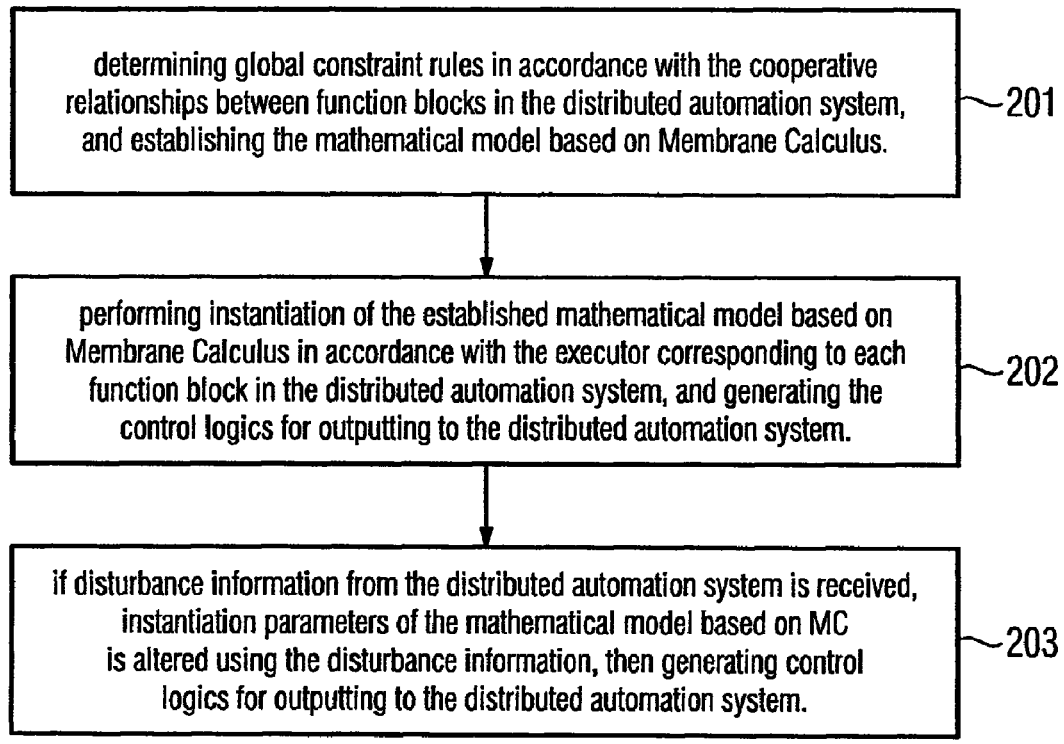
FIG. 2 is a flow chart of a method in accordance with an embodiment of the present invention.

The method of the present invention is shown in FIG. 2, which can comprise mainly the following steps:

Step 201: determining the global constraint rules according to the cooperative relationships between the FBs in the distributed automation system, and establishing a mathematical model based on Membrane Calculus.

Step 202: after the instantiation of the mathematical model based on Membrane Calculus according to the executor corresponding to each of the FBs in the distributed automation system, generating the control logics for outputting to the above-mentioned distributed automation system.

Step 203: if disturbance information is received from the distributed automation system, altering the instantiation parameters of the mathematical model based on Membrane Calculus using the disturbance information, and then generating the control logics for output to the distributed automation system.

During the operation of the distributed automation system, it is possible that the disturbance information from the distributed automation system is received at a certain time interval and, in this case, re-performance of step 203 is required, without necessarily re-performing step 201 and step 202.

The mathematical model based on Membrane Calculus (MC) can describe complex generating processes systematically and illustratively using Membrane Calculus syntax, and describe a dynamic system in the form of membrane evolution. Since Membrane Calculus syntax is a precise mathematical expression, it can analyze and validate various uncertain factors and validities and has a high calculation speed. In view of these advantages, the present invention uses the MC mathematical model to control a distributed automation system.

Figure 3:
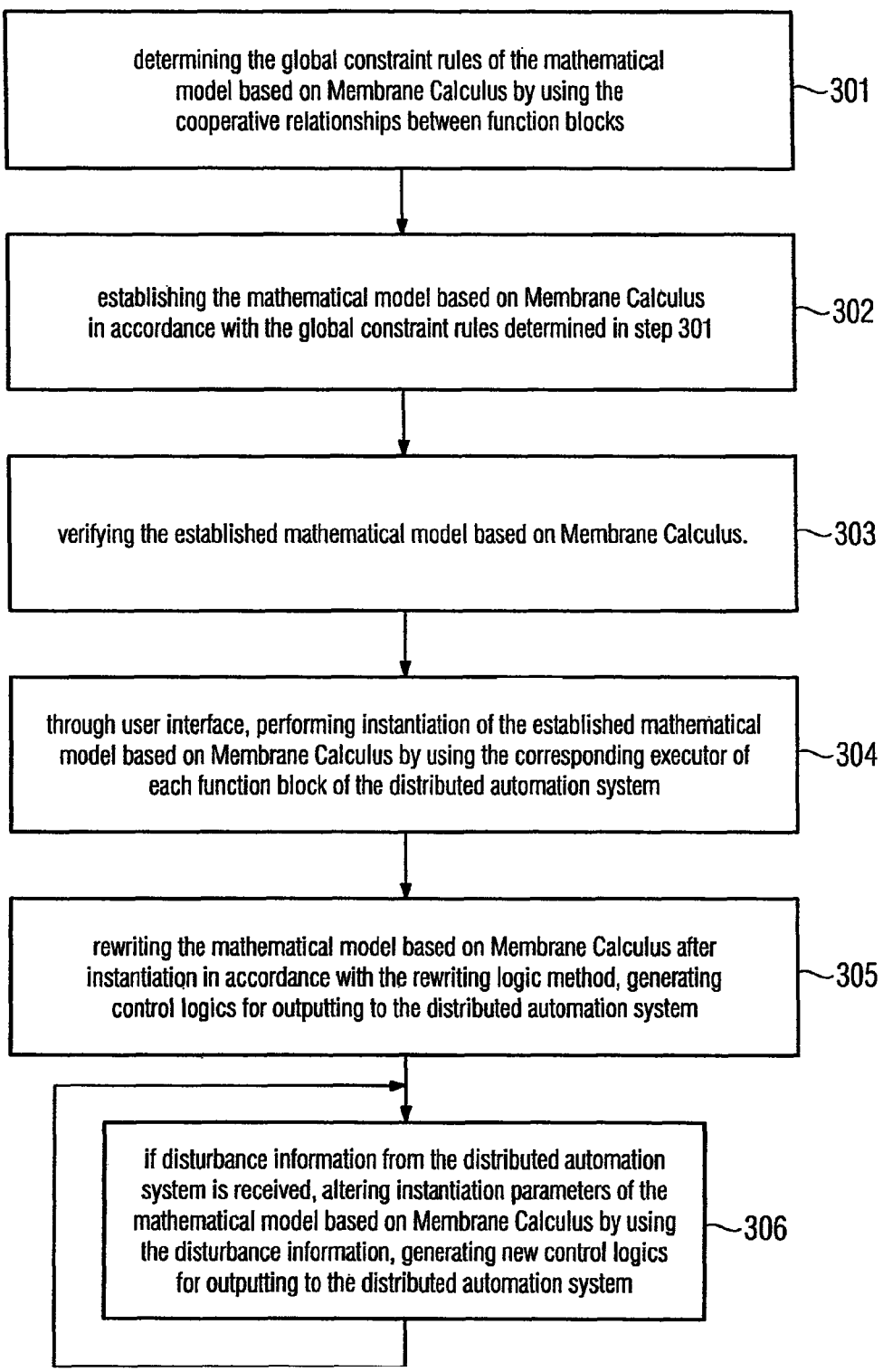
FIG. 3 is a detailed flow chart of the method in accordance with an embodiment of the invention.

The method mentioned above will be described in detail by way of an embodiment below. FIG. 3 is a detailed flow chart of the method in accordance with an embodiment of the invention, and as shown in FIG. 3, the method mainly comprises the following steps:

Step 301: the global constraint rules of the mathematical model based on MC are determined using the cooperative relationships between the FBs of the distributed automation system.

Description of MC comprises: Membranes, Objects and Rules. In this case, a membrane is a dynamic mapping of a specific environment, usually a specific FB is mapped. An object is a mapping of signals, parameters or messages transferred between FBs. The states and disturbances of the distributed automation system in the present invention will both affect the objects of a membrane. Rules are the mapping of the cooperative relationships between the distributed entities, which can be divided into Local Rules and Global Rules.

Figure 4:
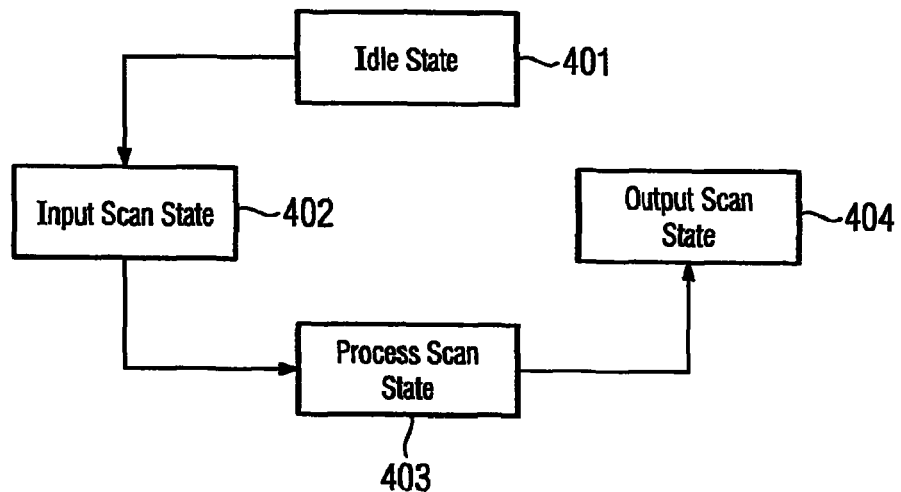
FIG. 4 is a schematic diagram of local rules in an MC model.

Here, local rules describe different internal scanned states during the process of a task to be executed, i.e., the scanned state of each of the stages of a programmable logic controller (PLC) program, and as shown in FIG. 4, and particularly they comprise: Idle state 401, Input Scan state 402, Program Scan state 403 and Output Scan state 404. Each FB is in an Idle state 401 at the beginning; and when events or data start to be transferred into the FB, it is in Input Scan state 402. When the FB performs computation or event processing, it is in the Program Scan state 403. When processing is completed and the results are output to an output cache, the FB is in the Output Scan state 404. Local Rules are inherent features of all the membranes in the MC model, i.e., they are universal rules, and they do not need to be adjusted or altered according to actual conditions.

Rules that need to be adjusted or altered according to actual states are Global Rules, and the difference between Global Rules will affect the mathematical model based on MC. Global Rules are actually global constraint conditions of the FBs. As a result, they are usually called Global Constraint Rules. As provided in IEC 61499, Global Constraint Rules mainly comprise the constraint events as follows: Synchronization constraint, Transition constraint, Delay constraint, Loop Limit constraint and Dependence constraint.

Here, Synchronization constraint can be divided into: an event separating described as 1:n and an event merging described as n:1. Transition constraint can be divided into: a permissible event propagating described as 1:1, an event detaching described as 1:n and an event selecting described as n:1. Delay constraint is time delay between two events. Loop Limit constraint is the loop limit of an event. Dependence constraint is the relevancy between two events, which can be divided into: Sequence constraint and Possible parallel constraint, for example. Sequence constraint described as E1 dep E2 E3 means: according to the sequence of event E1, event E2, event E3 or according to the sequence of event E1, event E3, event E2; and Possible parallel constraint described as E1 dep E2 E3 means: after the execution of event E1, event E2 and event E3 are executed synchronously.

Determining the global constraint rules according to the cooperative relationships between the FBs in the controlled distributed automation system can be implemented through a user interface such as a GUI (Graphical User Interface), in which the cooperative relationships between the FBs can be restrained by using a preset universal FB. The actual cooperative relationships between the FBs of the distributed automation system are used in the global constraint rules to establish the mathematical model based on the MC. The step is described below by way of the example shown in FIG. 5.

Figure 5:
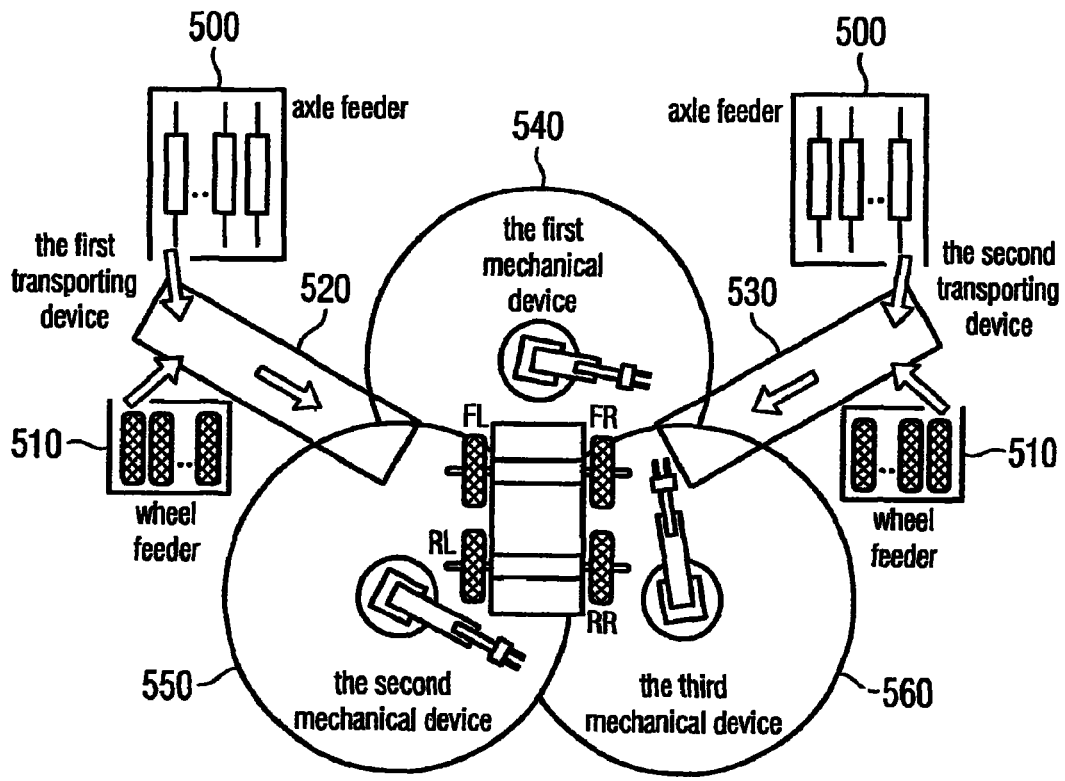
FIG. 5 is an exemplary schematic block diagram of a distributed automation system in accordance with an embodiment of the invention.

The distributed automation system shown in FIG. 5 is used to implement a wheel assembling link during automotive assembling, where an axle feeder 500 and a wheel feeder 510 are respectively used to send axle assembling material and wheel assembling material to a first transporting device 520 or a second transporting device 530 connected thereto. Then three automation assemblies, i.e., a first mechanical device 540, a second mechanical device 550 and a third mechanical device 560 synchronously perform operations of material acquisition and assembly. The embodiment is described by taking the control of the assembly tasks of the first mechanical device 540, the second mechanical device 550 and the third mechanical device 560, as an example.

The assembling task is divided into seven types in the form of "task: <operation>, <processing object>, <position>", and each of them can be mapped to a FB.

Task 1: beginning, platform, platform.
Task 2: welding front wheel, axle, front wheel.
Task 3: welding rear wheel, axle, rear wheel.
Task 4: piling hole, wheel, rear-left wheel.
Task 5: piling hole, wheel, rear-right wheel.
Task 6: piling hole, wheel, front-left wheel.
Task 7: piling hole, wheel, front-right wheel.

Assuming tasks 1 to 7 correspond successively to seven FBs, which are particularly FB_Start, FB_Fweld, FB_Rweld, FB_RL, FB_RR, FB_FL and FB_FR, so the cooperative relationships between these FBs can be: first performing FB_Start, then transporting to FB_Fweld and FB_Rweld which are performed synchronously, where FB_Fweld is further transported in the sequence of FB_FL and FB_FR, or in the sequence of FB_FR and FB_FL; and FB_Rweld is transported in the sequence of FB_RL and FB_RR, or of FB_RR and FB_RL.

Figure 6:
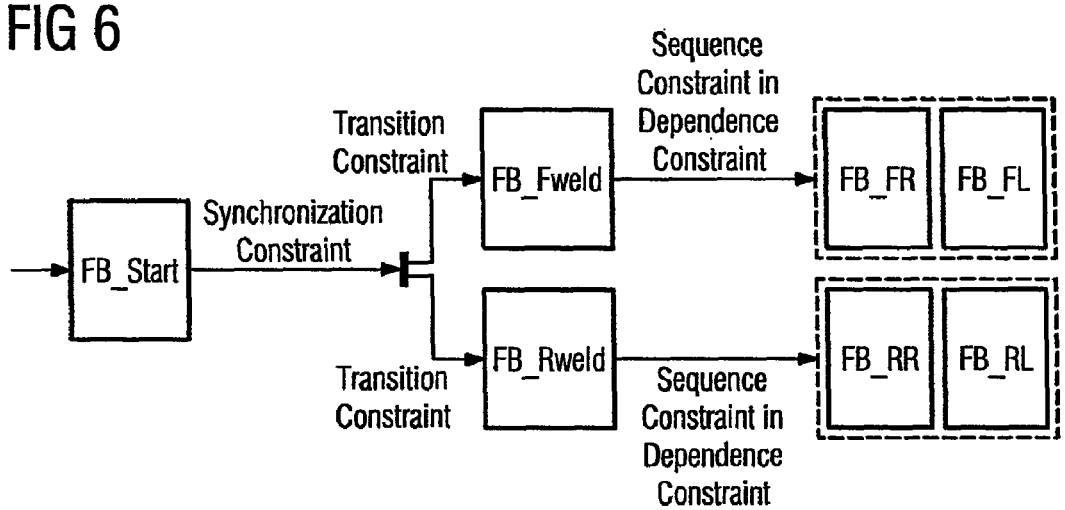
FIG. 6 is an exemplary schematic block diagram of a global constraint rule in accordance with an embodiment of the invention.

A user can plan the global constraint rules of the model on the GUI according to the cooperative relationships between the FBs as described above, as shown in FIG. 6, the constraint between FB_start and FB_Fweld and the constraint between FB_Start and FB_Rweld are respectively the Transition constraints, the constraint between FB_Fweld and FB_Rweld is the Synchronization constraint, the constraint between FB_Fweld and FB_FL and constraint between FB_Fweld and FB_FR are the Sequence constraint in the Dependence constraint, and the constraint between FB_Rweld and FB_RR and the constraint between FB_Rweld and FB_RL are the Sequence constraint in the Dependence constraint.

The corresponding Extensible Markup Language text format of the global constraints mentioned above can be as follows:

```
- <Global Constraints>
<name>Multi-Robot Assembly Cell</name>
<description />
<FB>FB__Start</FB>
```

```
Membrane (FB__Start)
Local rules:
[i: OO'|Idle, <O,E>|R,M]  ◊  [i: O'|Input Scan, <O,E>|R, E, M]
[i: D|O'|Input Scan, <D,DI>|R, E, M]  ◊  [i: O'|Program Scan, <D,DI>|R,
[DI,EI], M]
   [i: O'|Program Scan, R, [DI, <DI,DO>|R, EI], M]  ◊  [i: O'|Output Scan, R,
[DO, <DI,DO>|R, EO], M]
Global rules:
FB__Start:
[i: O', <E,EE>|R, EO, M]  ◊  [i: O', <E,EE>|R, EO, EO, M]
[i: O', <[E,M], [E][M]>|R, EO, EO, M>]  ◊  [i: O', <[E,M], [E][M]>|R,
M][EO][EO]
   [EO][i: O', <[E][M], [E,M]>|R, E, M]  ◊  [i: O', <[E][M], [E,M]>|R, EO, E, M]
   [i: O', <[E,M], [D,M]>|R, EO, E, M]  ◊  [i: D|O', <[E,M], [D,M]>|R, E, M]
   [EO] ][i: O', <[E][M], [E,M]>|R, E, M]  ◊  [i: O', <[E][M], [E,M]>|R, EO, E, M]
   [i: O', <[E,M], [D,M]>|R, EO, E, M]  ◊  [i: D|O', <[E,M], [D,M]>|R, E, M]
```

-continued

```
<FB>FB__Fweld</FB>
<FB>FB__Rweld</FB>
<FB>FB__FR</FB>
<FB>FB__FL</FB>
<FB>FB__RR</FB>
<FB>FB__RL</FB>
- <constraints>
<type>Synchronism</type>
<from>FB__Start</from>
<to>FB__Fweld</to>
<to>FB__Rweld</to>
<description />
</constraints>
- <constraints>
      <type>Transition</type>
      <from>FB__Start</from>
      <to>FB__Fweld</to>
      <description />
   </constraints>
   - <constraints>
<type>Transition</type>
<from>FB__Start</from>
<to>FB__Rweld</to>
<description />
</constraints>
- <constraints>
<type>DEPENDENCE</type>
<from>FB__Fweld</from>
<to>FB__FR</to>
<to>FB__FL</to>
<relation>sequence</relation>
<description />
</constraints>
   - <constraints>
<type>DEPENDENCE</type>
      <from>FB__Rweld</from>
      <to>FB__RR</to>
      <to>FB__RL</to>
      <relation>sequence</relation>
      <description />
      </constraints>
      </GlobalConstraints>
```

Step 302: the mathematical model based on MC is established according to the global constraint rules determined in step 301.

In this step, each FB is mapped to a membrane, and the mathematical model based on MC is established using the global constraint rules as determined above which represent the cooperative relationships between the FBs, where the local rules in the mathematical model use the universal form, and the Objects use universal parameter form.

In the mathematical model based on MC, the description of FB_Start using MC syntax is as follows:

Each FB has a corresponding description in the model, the description above is only an example of FB_Start, and the description of the other FBs will not be made redundantly here.

Step 303: the established mathematical model based on MC is verified.

Due to the complicated structure and implementation of many distributed automation systems, a user may make mistakes when establishing the global constraint rules in step 301, and cause errors in the mathematical model based on MC, thus leading to problems such as deadlock or an inability to achieve the expected results. Therefore, it is necessary to verify the mathematical model based on MC in a complicated distributed automation system.

When verifying a mathematical model, the following method in three levels can be used according to actual system requirements:

the first level: verification at syntax level. This is a relatively routine checkout process, which checks obvious errors by verifying MC syntax in the model, for example, whether there are repeated names, whether there is a lack of cooperative relationships, whether there are loops produced, or whether there are repeated inputs, etc. If there is no error of MC syntax found, the verification is passed.

The second level: verification at simulation level. Simulation is a frequently used tool in the art of automation, which can be performed by operating a programmable logic controller (PLC) unit in a virtual environment. In the present invention, the simulation test of a mathematical model based on MC can be performed using simulation tools, and if it can correctly run and achieve the expected results, verification is passed. This method of verification is capable of checking inconspicuous errors in the mathematical model to provide to the user an overall impression of controlling the distributed automation system by using the mathematical model, and to modify the mathematical model in time according to needs.

The third level: verification at criteria level. Verification at this level can be performed by LTL (Linear Temporal Logic), using a rewriting logics method to verify whether the established mathematical model based on MC achieves a preset criteria value, and here the criteria can be no deadlock, activity, correctness, etc.

If verification of the mathematical model is passed, the following steps are continued, and if verification failed, results about verification failure will be fed back to the user through a user interface, which is used as a reference to the user for re-determining Global Constraint Rules.

Step 304: through a user interface, the instantiation of the established mathematical model based on MC is performed by using the executor corresponding to each FB in the distributed automation system.

The user can determine the actual executor of each FB according to the structure of the controlled distributed automation system, i.e., the user can set the information of the executor corresponding to each FB in the distributed automation system as the instantiation parameter of each membrane. In the distributed automation system shown in FIG. 5, as a default, the platform corresponds to FB_Start, the first mechanical device 540 to FB_Fweld, FB_FL and FB_FR, the second mechanical device 550 to FB_Rweld, FB_RL, FB_RR and FB_FL, and the third mechanical device 560 to FB_Rweld, FB_RL, FB_RR and FB_FR.

The corresponding relationships used in the instantiation are shown in Table 1, and contents input by the user through a user interface are usually contents in the second row of Table 1.

TABLE 1

| executors | instantiation parameters | membranes |
| --- | --- | --- |
| platform | FB_Start1 | FB_Start |
| the first mechanical device | FB_Fweld1 | FB_Fweld |
|  | FB_FR1 | FB_FR |
|  | FB_FL1 | FB_FL |
| the second mechanical device | FB_Rweld2 | FB_Rweld |
|  | FB_FL2 | FB_FL |
|  | FB_RL2 | FB_RL |
|  | FB_RR2 | FB_RR |
| the third mechanical device | FB_Rweld3 | FB_Rweld |
|  | FB_FR3 | FB_FR |
|  | FB_RR3 | FB_RR |
|  | FB_RL3 | FB_RL |

In actuality, this step is to perform specific association between the mathematical model based on MC and the actually controlled distributed automation system, i.e., to map each entity of the distributed automation system to each membrane of the mathematical model, and to assign instantiation parameters to each membrane. Since the state of the distributed automation system is the original state at the beginning of control, there are no disturbance feedbacks. Consequently, the influence of disturbance is not taken into account in this step.

The instantiation operation in this step can be input by the user over a user interface, and can also be performed by the user by calling instantiation parameters in an instance database using the user interface.

Step 305: the mathematical model based on MC is rewritten after the instantiation according to a rewriting logics method, thus generating the control logics for output to the distributed automation system.

After performing the instantiation of the mathematical model based on MC, the MC expression can be rewritten according to the rewriting logics method to obtain rewritten results, then the rewritten results are converted into the control logics, and the contents of this part are the prior art, which are not described redundantly here.

Step 306: if disturbance information from the distributed automation system is received, the instantiation parameters of the mathematical model based on MC are altered using the disturbance information, and new control logics are generated for output to the distributed automation system.

If no disturbance information is received from the distributed automation system, the distributed automation system is controlled continuously using the control logics generated in step 305 until the operation process of the distributed automation system is completed.

However, during the operation of the distributed automation system, there are often some predictable or unpredictable disturbances, which may be changes in the state of the environment of the distributed automation system or changes in the state or parameters of each entity of the distributed automation system. The information of these disturbances may affect operation of the distributed automation system, so under certain circumstances it is necessary to adjust the control of the distributed automation system. Since the information of these disturbances actually affects the instantiation parameters of each membrane in the mathematical model based on MC, which represents particularly the changes of the executors of some FBs, in this step the FBs whose executor information has changed can be determined by using the disturbance information. The instantiation parameters of the corresponding membrane of the determined FBs are now modified so as to generate new control logics for outputting to the distributed automation system. There is no need to repeat the other steps, such as model generation or instantiation, by the user through the user interface.

Figure 7:
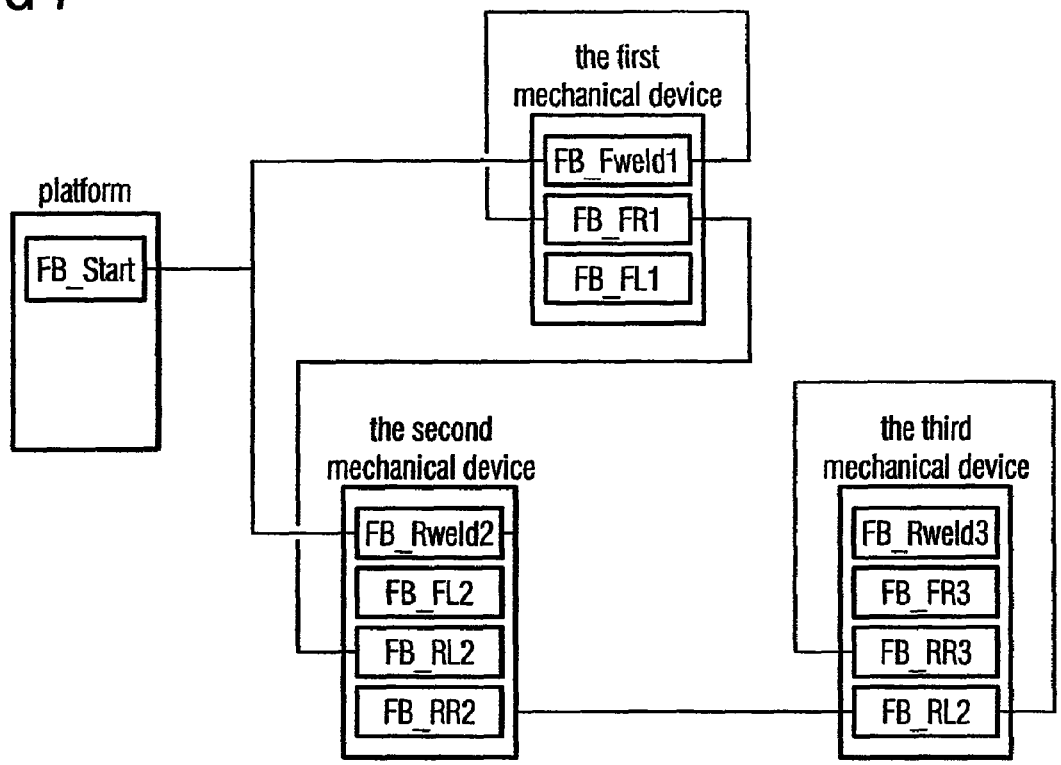
FIG. 7 is an exemplary schematic block diagram of the control logics in accordance with an embodiment of the invention.
Figure 8:
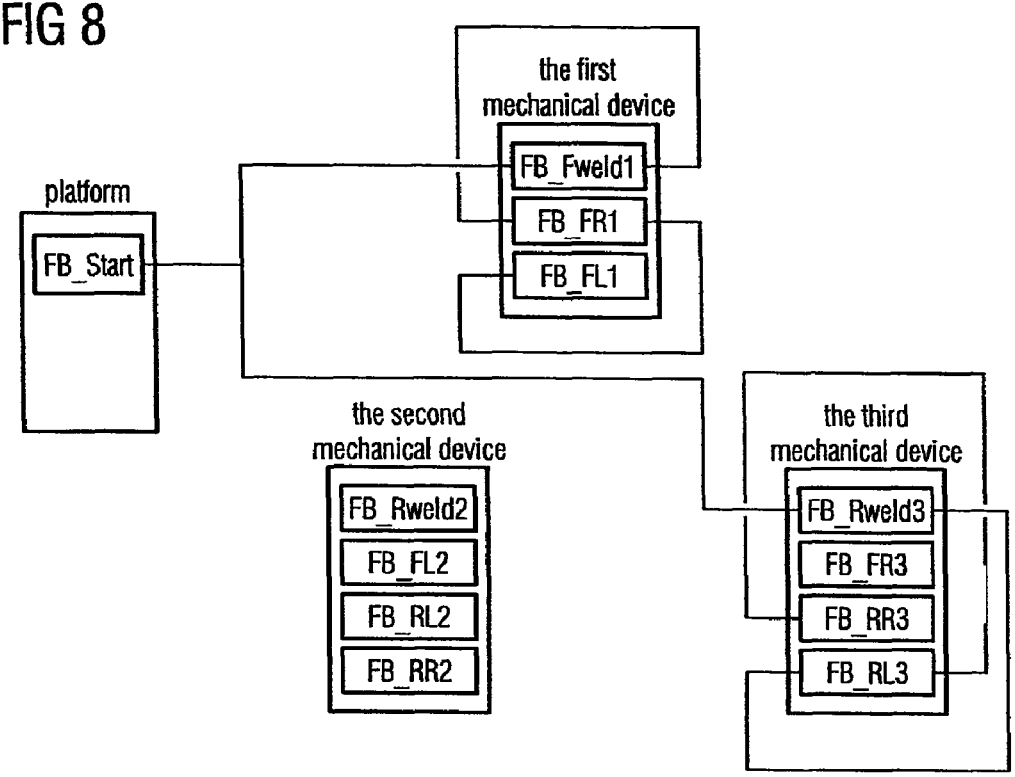
FIG. 8 is an exemplary schematic block diagram of the control logics generated after the occurrence of disturbances in accordance with an embodiment of the invention.

The control logics in the present invention are actually the control commands to the distributed automation system. For example, the control logics generated after the execution of step 305 are shown in FIG. 7. If the distributed automation system feeds back the disturbance information of a malfunction of the second mechanical device, the instantiation parameters of membranes of the mathematical model after the instantiation will be altered according to the disturbance information. In this example, after the malfunction of the second mechanical device has occurred, the instantiation parameter corresponding to FB_Rweld is only FB_Rweld3, without comprising FB_Rweld2, the instantiation parameter of FB_FL is only FB_FL1, without comprising FB_FL2, the instantiation parameter of FB_RL is only FB_RL3, without comprising FB_RL2, the instantiation parameter of FB_RR is only FB_RR3, without comprising FB_RR2, so the mathematical model is rewritten based on these altered instantiation parameters according to the rewriting logic method, and the generated new control logics are shown in FIG. 8, where the first mechanical device and the third mechanical device cooperate to complete the assembling task.

The disturbances that occurred may be the alteration of a portion of functions of some entities, for example, it may be the malfunction of a piling hole of the rear-left wheel at the second mechanical device, but other functions are normal, and in this case, only the corresponding instantiation parameter of FB_RL needs to be altered. Other disturbance information is also possible, and the disturbances will not be exhausted here.

Figure 9:
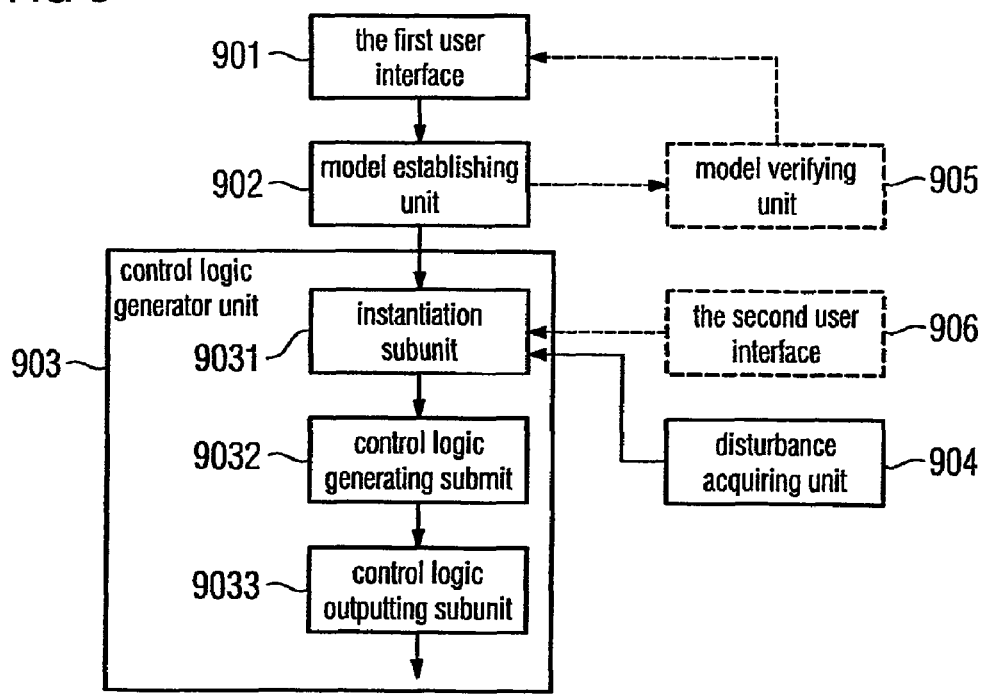
FIG. 9 is an exemplary structural diagram of an apparatus in accordance with an embodiment of the present invention.

The above contents are a detailed description of the method provided in the present invention, and the apparatus provided in the present invention will be described in detail below. FIG. 9 is a structural diagram of the apparatus provided in an embodiment of the present invention, and as shown in FIG. 9, the apparatus can comprise: a first user interface 901, a model establishing unit 902, a control logic generator unit 903, and a disturbance acquiring unit 904.

The first user interface 901 acquires the cooperative relationships between the FBs in the distributed automation system as the global constraint rules, and provides the global constraint rules to the model establishing unit 902.

The model establishing unit 902 establishes a mathematical model based on MC according to the global constraint rules.

The control logic generator unit 903 generates the control logics according to the executor corresponding to each of the FBs in the distributed automation system, outputs the control logics to the distributed automation system after the instantiation of the mathematical model based on MC, and alters the instantiation parameters of the mathematical model based on MC using the disturbance information provided by the disturbance acquiring unit 904, so as to generate the control logics for output to the distributed automation system.

The disturbance acquiring unit 904 receives the disturbance information from the distributed automation system and provides the information to the control logic generator unit 903. Here, the first user interface 901 mentioned above can provide a user interface such as GUI, and the user can determine the global constraint rules through the first user interface 901 according to the actual cooperative relationships between the FBs of the distributed automation system. The global constraint rules can comprise: a Synchronization constraint which comprises event splitting and event merging, a Transition constraint which comprises permissible event propagating, event detaching and event selecting, a Delay constraint, a Loop Limit constraint and a Dependence constraint which comprises a Sequence constraint and a Possible Parallel constraint.

When the model establishing unit 902 establishes the mathematical model based on MC, it maps each FB in the distributed automation system to membranes of the mathematical model based on MC, and maps the cooperative relationships between the FBs input by the user to the global constraint rules of the mathematical model based on MC, and establishes the mathematical model based on MC.

Moreover, in order to ensure the correctness of the mathematical model based on MC, the apparatus can further comprise: a model verifying unit 905 for verifying at the Syntax Level, Simulation Level or Criteria Level the mathematical model based on MC generated by the model establishing unit 902. In this case, if the verification passes, the control logic generator unit 903 is triggered to perform the operation of instantiation and establishing the control logics, and if the verification fails, the first user interface 901 is instructed to re-acquire the cooperative relationships between the FBs of the distributed automation system.

If the verification fails, the model verification unit 905 can display the relative information about verification failure to the user through the first user interface 901, and the user can re-input the global constraint rules through displayed information. Moreover, verification levels increase in the order of syntax level verification, simulation level verification and criteria level verification. The user can select the verification level based on needs, and the model verification unit 905 can also display the verification process to the user via the first user interface 901, and let the user have a visual impression about the mathematical model based on MC.

The above-described control logic generator unit 903 can comprise particularly: an instantiating subunit 9031, a control logic generating subunit 9032 and a control logic outputting subunit 9033.

The instantiating subunit 9031 performs the instantiation of the mathematical model based on MC according to the executor corresponding to each FB in the distributed automation system; and alters the instantiation parameters of the mathematical model based on MC using disturbance information provided by the disturbance acquiring unit 904.

The control logic generating subunit 9032 rewrites the mathematical model based on MC according to the rewriting logics method, after the instantiation or the alteration of instantiation parameters to generate the control logics.

The control logic outputting subunit 9033 outputs the control logics generated by the control logic generating subunit 9032 to the distributed automation system.

Here, the disturbance information acquired by the disturbance acquiring unit 904 may be changes of environment state of the distributed automation system, or changes of the state or parameters of the entities in the distributed automation system, and all such disturbance information can affect the instantiation parameters of each membrane of the mathematical model based on MC, which represents alteration of the executors of some FBs.

The apparatus can further comprise: a second user interface 906 which acquires instantiation parameters input by the user according to the information of the executor corresponding to each FB in the distributed automation system, or the instantiation parameters called from an instantiation parameter database and provide them to the instantiating subunit 9031.

The instantiating subunit 9031 will assign the instantiation parameters to the corresponding membrane of each FB, so as to perform the instantiation of the mathematical model based on MC.

When altering the instantiation parameters, the disturbance information is the alteration of the instantiation parameters of membrane caused by changes of the corresponding executor of some FBs, the instantiating subunit 9031 can determine the FBs whose executor information has been altered according to the disturbance information provided by the disturbance acquiring unit 904, alter determined instantiation parameters of the corresponding membrane of the FB, and generate the control logics for output to the distributed automation system.

In an actual implementation of the invention, the user can input the cooperative relationships between the FBs in the distributed automation system through the first user interface 901 as the global constraint rules, and the model establishing unit 902 maps each FB to the membranes and maps the cooperative relationships between the FBs to global constraint rules to establish the mathematical model based on MC. After the model is established, the mathematical model based on MC can be verified through the model verification unit 905. The verification can be the syntax level verification, the simulation level verification or the criteria level verification. With simulation level verification, as an example, the mathematical model based on MC is operated in a virtual environment to validate whether such problems as deadlock and loop appear, and whether control output is correct. Simulation process and verification results can be displayed to the user the first user interface 901. If verification fails, the user will be instructed to re-input the cooperative relationships between the FBs of the distributed automation system via the first user interface.

If the verification passes, the user can input instantiation parameters of the FBs through the second user interface 906 according to the executor corresponding to each FB in the distributed automation system, and can provide these parameters to the control logic generator unit 903. The control logic generator unit performs instantiation of the mathematical model based on MC using the instantiation parameters input through the second user interface 906, rewrites the mathematical model after the instantiation according to the rewriting logic method, generates the control logics for outputting to the distributed automation system, and the distributed automation system then performs corresponding operations according to the control logics.

The distributed automation system is able to feed back disturbance information during operation, and the disturbance acquiring unit 904 provides such disturbance information to the control logic generator unit 903 after it acquires the disturbance information of the distributed automation system. The control logic generator unit 903 alters the instantiation parameters of the mathematical model based on MC according to the disturbance information, rewrites the mathematical model based on MC after alteration of the instantiation parameters according to the rewriting logic method, and generates new control logics for outputting to the distributed automation system. After the disturbance information is generated during the operation of the distributed automation system, new control logics are generated only by the control logic generator unit 903, without affecting the other units.

It can be seen from the above description that the method and apparatus provided in the present invention determine the global constraint rules according to the cooperative relationships between the FBs in the distributed automation system, establish the mathematical model based on MC, and perform the instantiation of the mathematical model according to the executor corresponding to each FB, so as to generate control logics for output to the distributed automation system. After disturbances in the distributed automation system have occurred, the mathematical model will not be affected or altered, there is no need to write new codes manually. It is only necessary to automatically alter the instantiation parameters of the mathematical model based on MC by using the disturbance information to generate new control logics and output the new control logics to the distributed automation system without stopping the operation of the distributed control system, saving both time and manpower. Moreover, when the mathematical model is established and the logics are generated using the method of the present invention, all the disturbances occurring affect the instantiation parameters of membranes, and the method for establishing new control logics using this feature can effectively deal with all the unpredictable disturbances and greatly improve the adaptability.

The MC syntax used in the present invention is capable of simulating a dynamic system accurately, and is capable of dealing with the operating environment of the distributed automation system and disturbances during operation intelligently and flexibly.

Furthermore, all the FBs in the present invention can be used for repackaging and use, i.e., for different distributed automation systems. In addition, the FBs can be combined flexibly so as to set the cooperative relationships as the global constraints to generate the mathematical model based on MC. It is not necessary to alter the preset program, which has a greater level of flexibility.

What are described above are merely preferred embodiments of the present invention, and are not intended to limit the present invention, and any modification, equivalent replacement and improvement within the spirit and principle of the present invention should be contained in the protective scope of the present invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling a distributed automation system, which method comprises:
    determining global constraint rules in accordance with cooperative relationships between function blocks in the distributed automation system, and establishing a mathematical model based on Membrane Calculus;
    performing instantiation of the established mathematical model based on Membrane Calculus in accordance with an executor corresponding to each of the function blocks in the distributed automation system;
    generating control logics for output to the distributed automation system; and
    if disturbance information is received from the distributed automation system, altering parameters of the instantiation of the mathematical model based on the Membrane Calculus by using the disturbance information, and generating control logics for output to the distributed automation system.

2. The method as claimed in claim 1, wherein said establishing the mathematical model based on the Membrane Calculus comprises:
    mapping each of the function blocks in the distributed automation system onto a membrane of the mathematical model based on the Membrane Calculus; and
    mapping the cooperative relationships between the function blocks onto global constraint rules of the mathematical model based on the Membrane Calculus to establish the mathematical model based on the Membrane Calculus.

3. The method as claimed in claim 2, wherein said global constraint rules comprise:
    a synchronization constraint including event splitting and event merging;
    a transition constraint including a permissible event propagating, event detaching and event selecting;
    a delay constraint;
    a loop limit constraint; and
    a dependence constraint including a sequence constraint and a parallel constraint.

4. The method as claimed in claim 3, wherein following said establishing the mathematical model based on the Membrane Calculus, the method further comprising:
    verifying the mathematical model based on the Membrane Calculus at one of syntax level, simulation level and criteria level, and if the verification is passed, performing said step performing instantiation of the mathematical model established based on the Membrane Calculus in accordance with the executor corresponding to each of the function blocks in the distributed automation system; and
    if the verification failed, re-performing said step of determining global constraint rules in accordance with the cooperative relationships between the function blocks in the distributed automation system.

5. The method as claimed in claim 3, wherein said step of generating control logics comprises:
    rewriting, in accordance with a logic rewriting method, the mathematical model based on the Membrane Calculus after the instantiation thereof or the alteration of the instantiation parameters thereof; and generating the control logics based on the rewritten mathematical model.

6. The method as claimed in claim 2, wherein following said establishing the mathematical model based on the Membrane Calculus, the method further comprising:
   verifying the mathematical model based on the Membrane Calculus at one of syntax level, simulation level and criteria level, and if the verification is passed, performing said step performing instantiation of the mathematical model established based on the Membrane Calculus in accordance with the executor corresponding to each of the function blocks in the distributed automation system; and
   if the verification failed, re-performing said step of determining global constraint rules in accordance with the cooperative relationships between the function blocks in the distributed automation system.

7. The method as claimed in claim 2, wherein said step of performing the instantiation of the established mathematical model based on the Membrane Calculus comprises:
   using the information of the executor corresponding to each of the function blocks in the distributed automation system as instantiation parameters corresponding to each membrane of the mathematical model of the membrane Calculus.

8. The method as claimed in claim 7, wherein the altering the parameters of the instantiation of the mathematical model based on the Membrane Calculus comprises:
   determining the function blocks whose executor information has been altered in accordance with the received disturbance information; and
   altering the instantiation parameters of the corresponding membrane of the function block so determined.

9. The method as claimed in claim 8, wherein said step of generating control logics comprises:
   rewriting, in accordance with a logic rewriting method, the mathematical model based on the Membrane Calculus after the instantiation thereof or the alteration of the instantiation parameters thereof; and
   generating the control logics based on the rewritten mathematical model.

10. The method as claimed in claim 7, wherein said step of generating control logics comprises:
    rewriting, in accordance with a logic rewriting method, the mathematical model based on the Membrane Calculus after the instantiation thereof or the alteration of the instantiation parameters thereof; and
    generating the control logics based on the rewritten mathematical model.

11. The method as claimed in claim 2, wherein said step of generating control logics comprises:
    rewriting, in accordance with a logic rewriting method, the mathematical model based on the Membrane Calculus after the instantiation thereof or the alteration of the instantiation parameters thereof; and
    generating the control logics based on the rewritten mathematical model.

12. The method as claimed in claim 1, wherein following said establishing the mathematical model based on the Membrane Calculus, the method further comprising:
    verifying the mathematical model based on the Membrane Calculus at one of syntax level, simulation level and criteria level, and if the verification is passed, performing said step performing instantiation of the mathematical model established based on the Membrane Calculus in accordance with the executor corresponding to each of the function blocks in the distributed automation system; and
    if the verification failed, re-performing said step of determining global constraint rules in accordance with the cooperative relationships between the function blocks in the distributed automation system.

13. The method as claimed in claim 1, wherein said step of generating control logics comprises:
    rewriting, in accordance with a logic rewriting method, the mathematical model based on the Membrane Calculus after the instantiation thereof or the alteration of the instantiation parameters thereof; and
    generating the control logics based on the rewritten mathematical model.

14. An apparatus for controlling a distributed automation system, comprising:
    a first user interface for determining global constraint rules in accordance with cooperative relationships acquired between function blocks in the distributed automation system and for providing the global constraint rules;
    a model establishing unit for establishing a mathematical model based on Membrane Calculus in accordance with the global constraint rules and for receiving the global constraint rules from the first user interface;
    a disturbance acquiring unit for receiving disturbance information from the distributed automation system; and
    a control logic generator unit for generating, in accordance with the executor corresponding to each of the function blocks in the distributed automation system and after instantiation of the mathematical model based on Membrane Calculus, control logics for output to the distributed automation system and for altering the instantiation parameters of the mathematical model based on the Membrane Calculus using the disturbance information acquired from the disturbance acquiring unit to generate control logics for output to the distributed automation system.

15. The apparatus as claimed in claim 14, further comprising:
    a model verifying unit for verifying the mathematical model at one of syntax level, simulation level or criteria based on Membrane Calculus established by said model establishing unit;
    wherein if the verification passes, then the control logic generator unit is triggered to perform the operations of said instantiation logics and to generate the control logics, and if the verification fails, then the first user interface is instructed to acquire the cooperative relationships between function blocks in the distributed automation system.

16. The apparatus as claimed in claim 15, wherein the control logic generator unit comprises:
    an instantiating subunit for performing instantiation of the mathematical model based on the Membrane Calculus as claimed in the executor corresponding to each of the function blocks in the distributed automation system, and for altering instantiation parameters of the mathematical model based on the Membrane Calculus using the disturbance information provided by the disturbance acquiring unit;
    a control logics generating subunit for rewriting, as claimed in a rewriting logic method, the mathematical model based on the Membrane Calculus after the instantiation thereof or the alteration of the instantiation parameters and generation of the control logics; and a control logics outputting subunit for outputting the control logics generated by the control logics generating subunit to the distributed automation system.

17. The apparatus as claimed in claim 14, wherein the control logic generator unit comprises:
- an instantiating subunit for performing instantiation of the mathematical model based on the Membrane Calculus as claimed in the executor corresponding to each of the function blocks in the distributed automation system, and for altering instantiation parameters of the mathematical model based on the Membrane Calculus using the disturbance information provided by the disturbance acquiring unit;
- a control logics generating subunit for rewriting, as claimed in a rewriting logic method, the mathematical model based on the Membrane Calculus after the instantiation thereof or the alteration of the instantiation parameters and generation of the control logics; and
- a control logics outputting subunit for outputting the control logics generated by the control logics generating subunit to the distributed automation system.

18. The apparatus as claimed in claim 17, further comprising:
- a second user interface for acquiring the instantiation parameters and for providing the instantiation parameters to the instantiating subunit, said instantiation parameters being one of input by a user in accordance with the information of the executor corresponding to each of the function blocks in the distributed automation system and called from an instantiation parameter database;
- wherein said instantiating subunit assigns the instantiation parameters to a corresponding membrane of each of the function blocks to perform instantiation of the mathematical model based on the Membrane Calculus.

19. The apparatus as claimed in claim 17, wherein the instantiating subunit determines the function blocks whose executor information has been altered as claimed in the disturbance information provided by said disturbance acquiring unit, and alters the instantiation parameters of a determined corresponding membrane of the function block to generate the control logics for output to the distributed automation system.

* * * * *